United States Patent
Kavanagh

[11] 3,711,722
[45] Jan. 16, 1973

[54] DETECTING SYSTEMS AND THE LIKE

[75] Inventor: Arthur J. Kavanagh, Southbridge, Mass.

[73] Assignee: American Optical Company, Southbridge, Mass.

[22] Filed: July 28, 1958

[21] Appl. No.: 752,159

[52] U.S. Cl.................250/216, 250/83.3 H, 350/191
[51] Int. Cl...............................................H01j 3/14
[58] Field of Search ....313/101, 102; 338/15, 16, 17, 338/18, 19; 250/216, 83.3 H; 350/191

[56] References Cited

UNITED STATES PATENTS

| | | | |
|---|---|---|---|
| 2,153,614 | 4/1939 | Coeterier et al.........................313/65 |
| 2,187,071 | 1/1940 | Bergmans............................88/57 TL |
| 2,274,116 | 2/1942 | Wright...................................250/216 |
| 2,522,987 | 9/1950 | Buck.......................................88/23 G |
| 2,861,165 | 11/1959 | Aigrain et al...........................219/34 |

OTHER PUBLICATIONS

"Impurity Photoconduction in Germanium" by G. A. Morton et al., pages 556–565 of Photoconductivity Conference published by John Wiley & Sons, Inc., New York.

Primary Examiner—Richard A. Farley
Attorney—Noble S. Williams and Louis L. Gagnon

EXEMPLARY CLAIM

1. A light-collecting and detecting system comprising a lens having an annularly shaped toric refracting surface formed thereon in concentric relation to a central axis of said system, and in predetermined spaced relation to a preselected focal point on said axis, said lens having a second surface thereon transversely intersecting said axis substantially at said focal point, a layer of photosensitive material of relatively small size carried by said second surface adjacent said focal point, said annular refracting surface being, in all radial sections thereof, so disposed in offset relation to said axis and so spaced relative to said focal point and so convexly elliptically curved as to face outwardly in predetermined angular relation to said optical axis and simultaneously direct and concentrate substantially all of the light being received from corresponding parts of a conically shaped hollow annular object field of predetermined mean angular value and width onto said layer, whereby any material change in intensity in the light being received from any part of said annular object field will be detected by said photosensitive layer.

8 Claims, 3 Drawing Figures

PATENTED JAN 16 1973
3,711,722
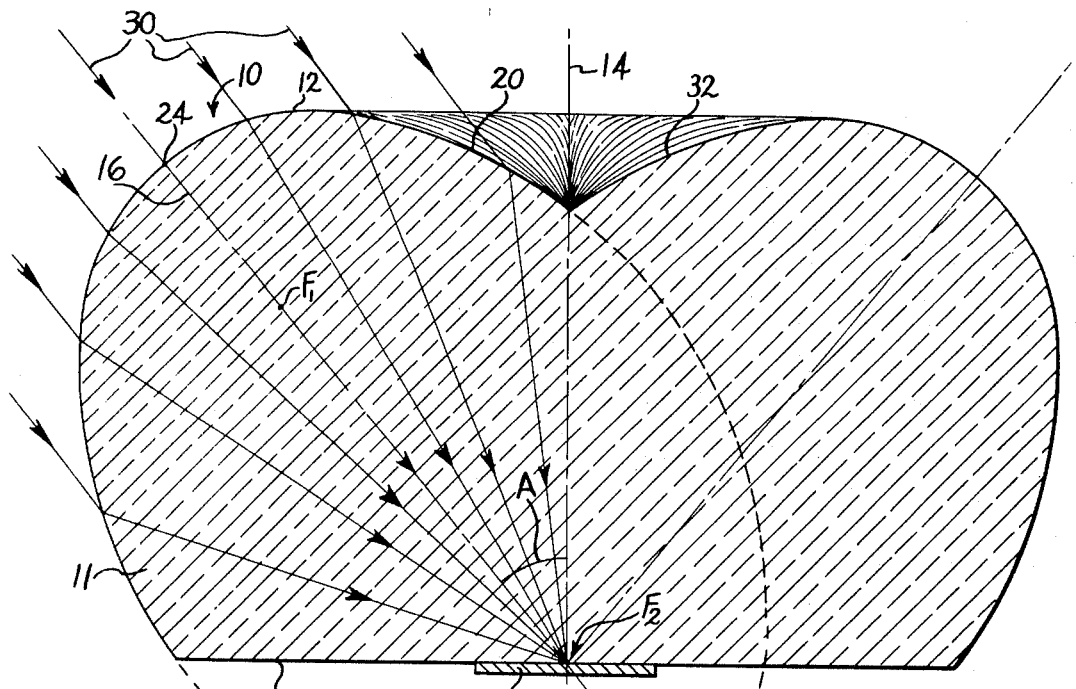
Fig. 1
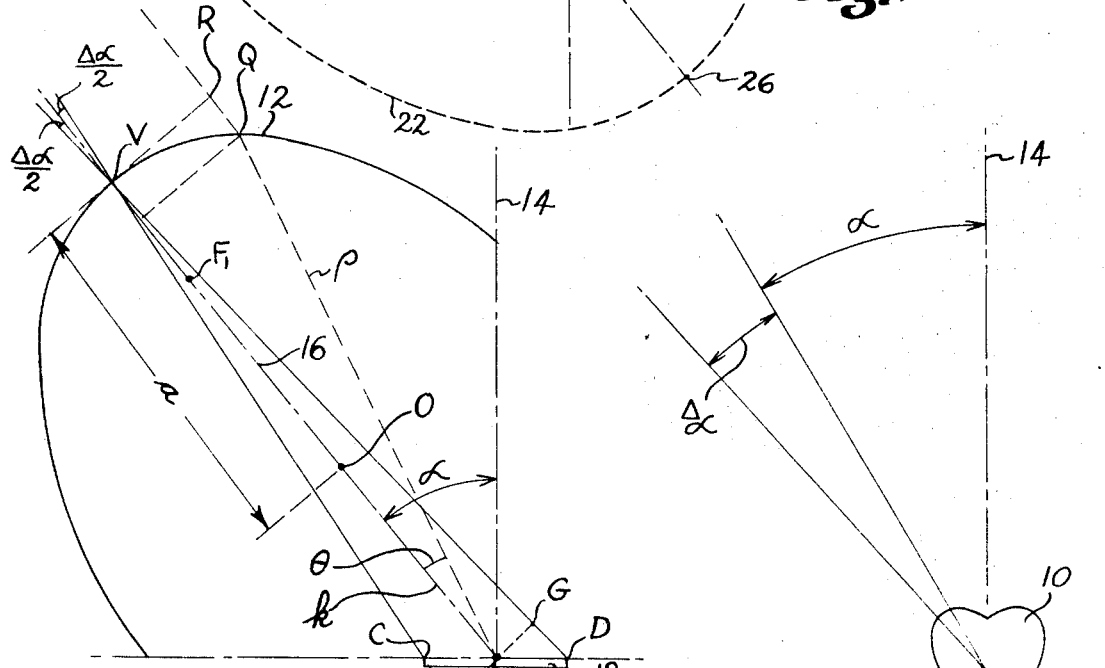
Fig. 3
Fig. 2
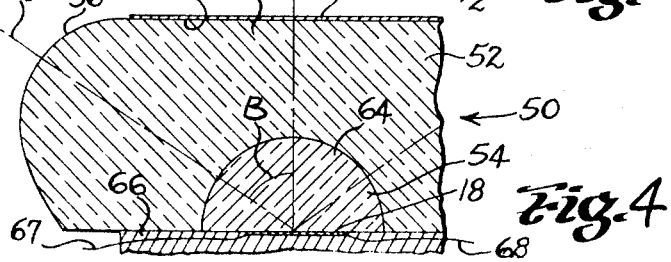
INVENTOR
ARTHUR J. KAVANAGH
BY Louis L. Gagnon
Noble S. Williams
ATTORNEYS

DETECTING SYSTEMS AND THE LIKE

This invention relates to light-collecting and detecting systems and the like comprising a lens employing one or more refracting optical components and photosensitive detecting means in operative association therewith. More particularly, the invention relates to such systems embodying refracting optical components or the like of improved light-gathering ability and associated photosensitive detecting means; these systems being of such construction, arrangement and design as to simultaneously optically view or monitor all parts of a predetermined hollow conically shaped annular object field of controlled mean angular value and size in such a manner as to collect light coming from any part of said field and direct same at increased intensity and high efficiency onto the surface of said photosensitive means, whether same be a photoconducting element, a photocell or the like, of small predetermined size located substantially at a focal plane of said system.

Detecting systems including optical components and photosensitive means which are adapted to simultaneously view and collect light from all parts of a hollow conically shaped annular object field and direct such light onto an associated photocell or the like are known. These systems of earlier design, however, have not been entirely satisfactory since they have failed to provide as high a light-gathering capacity and as high a degree of efficiency and light-sensitivity or ability to sense small changes in the light being received from any part of the annular object field being monitored as might be desired.

The light-collecting and detecting system of the present invention comprising a lens employing one or more optical components or the like and associated detecting means, on the other hand, is of such optical design and construction that not only is increased light-gathering ability provided for all parts of the annular object field of predetermined conical angle and size but also is such that a materially increased sensitivity is provided as compared to devices of earlier construction. Furthermore, the light-collecting and detecting system of the present invention is of such optical design and arrangement and the construction of the component parts thereof are such that they may be made efficiently and economically and assembled easily and accurately.

It is, accordingly, an object of the present invention to provide an improved light-collecting and detecting system comprising a positive lens employing one or more refracting optical component or components and associated light-detecting means constructed and arranged to simultaneously view and collect light from all parts of a hollow conically shaped annular object field of predetermined mean angular value and size and to detect changes, even very small changes in radiation occurring in any part of said field and being received thereby.

It is an additional object of the invention to provide an improved light-collecting and detecting system of the character described which will simultaneously view all parts of a conically shaped hollow annular object field of an exact predetermined mean angular value relative to a central axis of said system and which field has a relatively narrow predetermined transverse dimension or angular extent of viewing to either side of said mean angular value and which system will provide substantially the same high degree of sensitivity to changes in light intensity in all parts of said annular field.

Other objects and advantages of the present invention will become apparent from the detailed description which follows when taken in conjunction with the accompanying drawing in which:

FIG. 1 is an elevational sectional view showing a preferred form of light-collecting and detecting system embodying the present invention;

FIGS. 2 and 3 are diagrammatic sketches for use in obtaining an understanding of the invention; and FIG. 4 is an elevational sectional view showing a modified form of the invention.

Light-collecting and detecting systems comprising refracting optical components and associated detecting means made in accordance with the present invention are intended for use in collecting light, visible, ultraviolet and infra-red light, as the case may be, originating within any part of a hollow conically-shaped annular object field of predetermined mean angular value and transverse width or size and for directing the light so received from any object light source in said field onto a relatively small layer or the like of photosensitive material of predetermined carefully controlled size associated therewith. Accordingly, it is believed appropriate to state that such systems are for viewing and monitoring such an annular field and detecting light intensity changes therein.

To this end, there is shown in FIG. 1, a light-collecting and detecting system comprising a lens in the form of a positive refracting optical component 10 which is formed of a suitable known refractive material 11 (carefully chosen in accordance with the type of light energy to be transmitted thereby) and this component is accurately formed, as by casting, molding, grinding and polishing or the like, so as to provide a forwardly and outwardly or rearwardly and outwardly facing annular torically curved refracting surface 12. This surface is spaced from and curved in relation to a point $F_2$ on a central axis 14; said point being, in fact, the apex of a hollow conically shaped annular object field of the system. Since component 10 is intended to simultaneously view and monitor all parts of this hollow conically shaped annular object field, a predetermined mean apex angle A is indicated between the central axis 14 and a line 16. Thus, line 16 may be considered, in effect, as an elemental part of the mean conical field and would be a generatrix thereof if rotated 360° about axis 14. A plane transverse surface 15 of the component 10 passes through this point $F_2$ and, on this surface and concentric with this point, there is provided a layer of photosensitive material or the like 18 for receiving and sensing changes in the collected radiation.

The annular toric surface 12 which has been found to provide improved results including high light-gathering ability can best be described as being a surface of rotation such as would result from the rotation of the major part of a tilted ellipse of controlled characteristics 360° about axis 14. The correct dimensions and curvature of the ellipse to be used will be controlled (as will be more fully hereinafter described) in accordance with the refractive index $n_1$ of the refractive material being employed, the mean angular value of the hollow conical field to be viewed and the transverse width of this field. Such an ellipse having its rear focus located at the point $F_2$ on the central axis 14 and having its major axis coincident with line 16 and tilted an angular amount A relative thereto is indicated in FIG. 1 partially by solid line 20 and partially by dotted line 22. A first or forward focus of this ellipse is indicated at $F_1$ upon the line 16, and, accordingly, the major axis of the ellipse extends between a forward vertex point indicated at 24 and a rear vertex point 26.

In discussing the optical design of the component 10, it is convenient and sufficient to consider only the light rays in the plane of the paper and travelling from a distant object light source towards the component since this is a radial section of the component and similar to all other sections containing axis 14.

It is known that a refractive material may be so elliptically curved and proportioned in accordance with its refractive index as to cause substantially parallel light rays 30 from a distant source and travelling parallel to the major axis thereof to be refracted, upon entering the refracting material, so as to pass through the rear focus of the ellipse. Accordingly, it is desirable to so form the elliptically shaped refracting curvature of the component 10 that not only is an object field of predetermined transverse width or angular value provided for the component in the vicinity of the major axis 16 extended while maintaining the mean angular value A but also to have this elliptically shaped refracting surface so arranged that most of the light rays from object light sources within this object field will be directed toward and impinge upon the photosensitive layer 18 of small predetermined size and preferably circular shape.

Accordingly, in FIG. 2, it will be seen that the boundaries of a transverse radial section of a hollow conically shaped object field to be covered by the component 10 are indicated as contained between a cone having an apex angle with the central axis 14 equal to $\alpha$ and a second larger concentrically arranged cone having an apex angle of a value equal to $\alpha + \Delta\alpha$. An area of suitable predetermined size upon the flat surface 15 and in concentric relation to the second focal point $F_2$ for the photosensitive material 18 has been indicated between points C and D for receiving transmitted light. (This small predetermined area might be, for example, the size of an available photosensitive cell or the like). Thus, one may set the angle between the major axis 16 of the ellipse and the central axis 14 of the component of FIG. 1 so as to equal a suitable value within the range and $\alpha + \Delta\alpha$.

Also, it will be evident from FIG. 3 that if a point $V$ upon the major axis 16 and suitably spaced from the rear focal point $F_2$ is chosen, in accordance with the pre-established size of the detecting layer 18, to serve as the forward vertex point of an ellipse for refracting parallel light toward the rear focus $F_2$, then slightly off-axis light coming from opposite edge portions of the predetermined object field of the angular value indicated jointly by the two half angles indicated as equal to ($\Delta\alpha/2$) will, after refraction at the elliptical surface 12, be convergently directed so as to travel toward the photosensitive surface 18 and impinge upon parts thereof near the opposite side edge portions C and D thereof. Actually, the dotted line $E\,G$ is the projection of line $C\,D$ at right angles to the line $VF_2$ at point $F_2$ and thus will approximate the focal plane for the refracted light rays from all parts of the object field $\Delta\alpha$.

The distance $VF_2$ thus should be so chosen that the rays from the inner and outer edges of the object field to point $V$ on component 10 will be so refracted at the surface 12 as to be brought substantially to a focus at the opposite ends of line $E\,G$. Accordingly, if $n_1$ be the index of refraction of the refracting medium, it follows that the distance $VF_2$ may be determined by the following equation:

$$\sin G\,V\,F_2 = (1/n_1)\sin(\Delta\alpha/2) \quad (1)$$

and $$\tan G\,V\,F_2 = (GF_2/VF_2) \quad (2).$$

The distance $VF_2$ having thus been determined for a total object field of $\Delta\alpha$, the ellipse is determined by the requirement that the ellipse bring to a sharp focus at $F_2$ all light rays in the plane of the paper and parallel to the line $VF_2$ striking the surface 12.

It can, accordingly, be shown that if an ellipse is to have the required focusing action, the separation of its two foci $F_1$ and $F_2$ must be as follows:

$$F_1F_2 = (2VF_2/n+1) \quad (3)$$

Referring again to FIG. 3 and taking polar coordinates ($p$, $\theta$) for the ellipse, then in keeping with Fermat's principle, if all the rays parallel to line $VF_2$ are to be brought to a focus at $F_2$, it is necessary and sufficient, since the optical path lengths must be equal, that:

$$RQ + np = nVF_2 \quad (4)$$

wherein $n$ is the index of refraction of the refracting material of which the component is formed.

Also $RQ = VF_2 - p\cos\theta \quad (5)$ wherein $p$ is the distance travelled in the material from the point $Q$ on the ellipse to the back focus $F_2$ and $\theta$ is the angle included between the ray and line $VF_2$.

Accordingly, the relationship can be expressed:

$$VF_2 - p\cos\theta + np = nVF_2 \quad (6)$$

or $$p = (n-1)VF_2/n - \cos\theta) \quad (7)$$

This is the equation of an ellipse having one of its foci at $F_2$. Since the major axis of the ellipse as shown in FIG. 3 is equal to $2a$, the major axis is obtained by adding the values of $p$ for $\theta = 0°$ and $\theta = 180°$.

$$2a = VF_2 + (n - 1/n + 1)VF_2 \quad (8)$$

or $$2a = (2n)/n + 1)VF_2 \quad (9)$$

The distance $k$, from the center of symmetry 0 to focus $F_2$ is obtained from the equation:

$$k + a = VF_2 \quad (10)$$

or $$k = VF_2 - (n)/(n+1)VF_2\,(VF_2)/(n+1) \quad ((12)$$

Hence the distance 21 between the foci may be expressed:

$$F_1F_2 = (2VF_2)/(n+1) \quad (12)$$

As an example, let it be assumed that a collecting and detecting system of the character described is to be made having a value of 47.5° for the mean angle A of the conical field and that a transverse field of 2.5° (1.25° inwardly and outwardly from line 16 extended) is to be viewed. Also, let it be assumed that the area of the photosensitive layer 18 for collecting light from any and all parts of this hollow annular object field has already been given and that it has a diameter (C D) equal to 1 mm. Additionally, assume that infra-red radiation is to be transmitted and, accordingly, the component 10 will be formed of arsenic trisulphide having a refractive index $N_1 = 2.42$
Then $$EG = CD \cos 47.5° = 0.6756$$

$$\sin GVF_2 = (\sin 2.5°)/2.42) = 0.01802$$

Since $$(GF_2)/(VF_2) = (1/2)(EG)/(VF_2) = (0.3378)/(VF_2) = \tan 1.03°$$

then the forward vertex to back focus distance $VF_2 = 18.75$mm.
Therefore, since $$F_1F_2 = (2\ VF_2)/(n_1 + 1) = 2(18.75)/(2.42 + 1)$$

$$F_1F_2 = 10.96 \text{ mm}.$$

Now since the major axis of the ellipse, the distance between foci, the refractive index and the diameter of layer 18 have all been established, the exact system desired may be readily constructed.

In FIG. 4 are shown slight changes which may be incorporated in such an annular toric light-collecting and detecting system. First of all, the optical component 50 thereof is intentionally formed of two parts; an outer refracting element 52 and an inner refracting element 54. Preferably, these elements would be formed of different materials having nearly the same or different refractive indices, as desired. The outer part 52 carries an outer annular toric refracting surface 56, similar to surface 12 of component 10, but differs therefrom in that no dimple-like central depression (see surface portion 32 in FIG. 1) is provided therein. This construction may be preferred at times for several reasons; one reason being that since the system of FIG. 4 is intended to monitor a different hollow conically shaped field and thus employs a different mean conical angle B, which is much larger than the angle A of FIG. 1, and very little light substantially parallel to the ellipse axis 58 would strike the dimpled part of the refracting surface if present, and since it may be much simpler to fabricate the component without having to accurately form the dimpled surface, the central upper region 60 has been made solid. In fact, this region may even have its flat exposed surface 61 coated with an opaque material 62, if desired, for excluding extraneous light.

The component 50 is also modified in that it is provided with an accurately formed hemispherically concavely curved surface 64 for receiving the hemispherically shaped lower refracting element or part 54, which is preferably cemented thereto. One reason for such a modified construction might be that if any tendency for contamination of the refracting material forming component 10 of FIG. 1 by the photosensitive material 18, or contaminating of the photosensitive material by this refracting material, were liable to occur, such may be completely avoided by forming the refracting element 54 of a different refracting material having nearly equivalent refracting and transmission characteristics. For example, since arsenic trisulphide glass next to lead selenide as the photosensitive layer is not entirely satisfactory over a long period of time, it is possible even though more expensive to form the element 54 of selenium glass.

Also shown in FIG. 4 is cementing material 66 for securing the completed system to a suitable support (not shown) and electrical conductors 67 and 68 embedded in this cement are for connecting layer 18 to electronic amplifying equipment of known form.

The combination disclosed in FIG. 4 would be serviceable for infra-red radiation since arsenic trisulphide is transparent to light in the 1.0 to 6.0 micron range of the optical spectrum, and selenium glass is transparent in the visible and infra-red range out to at least 12 microns. In other instances, other more conventional and less expensive refractive materials would be used such as common forms of ophthalmic and colored filter glasses in the visible range, and optical glass in the range extending from the visible into the near infra-red and out to approximately 2.7 microns. For transmissions of radiation from the visible into the ultra-violet region as far as 250 millimicrons quartz and lithium fluoride may be used. With calcium fluoride, it is possible to cover spectrum range from the visible into the ultra-violet as far as 180 millimicrons. Of course, different known photosensitive material for the layer 18 may be used in accordance with the type of radiation to be detected.

Having described my invention, I claim:

1. A light-collecting and detecting system comprising a lens having an annularly shaped toric refracting surface formed thereon in concentric relation to a central axis of said system, and in predetermined spaced relation to a preselected focal point on said axis, said lens having a second surface thereon transversely intersecting said axis substantially at said focal point, a layer of photosensitive material of relatively small size carried by said second surface adjacent said focal point, said annular refracting surface being, in all radial sections thereof, so disposed in offset relation to said axis and so spaced relative to said focal point and so convexly elliptically curved as to face outwardly in predetermined angular relation to said optical axis and simultaneously direct and concentrate substantially all of the light being received from corresponding parts of a conically shaped hollow annular object field of predetermined mean angular value and width onto said layer, whereby any material change in intensity in the light being received from any part of said annular object field will be detected by said photosensitive layer.

2. A light-collecting and detecting system comprising a lens including first and second refractive elements of predetermined characteristics and a layer of photosensitive material of relatively small size, said first and second elements being disposed in operative relation to each other and having spherically curved concave and convex adjacent surfaces formed thereon and constituting an optical interface between said elements, an exposed annularly shaped convex toric refracting surface formed on said first element in concentric relation to a central axis of said lens and in predetermined spaced relation to a preselected focal point on said axis, said annular refracting surface being, in all radial sections thereof, so curved and so disposed in offset relation to said axis as to face outwardly toward a hollow conically shaped annular object field in predetermined angular relation to said axis and said focal point thereon, said second element having a second surface thereon arranged to transversely intersect said axis substantially at said focal point and supporting said layer of photosensitive material adjacent said focal point, the convex curvature of said annular surface, in each radial section thereof being such as to focus light from a distant light source anywhere in said annular field substantially at said focal point, whereby any material change in intensity in the light being received from any part of said predetermined annular object field will be directed onto said photosensitive layer and be detected thereby.

3. A light-collecting and detecting system comprising a lens having an annularly shaped toric refracting surface formed thereon in concentric relation to a central axis of said system, and in predetermined spaced relation to a preselected focal point on said axis, said lens having a second surface thereon transversely intersecting said axis substantially at said focal point, a layer of photosensitive material of relatively small size carried by said second surface adjacent said focal point, said annular refracting surface being, in all radial sections thereof, so disposed in offset relation to said axis and so spaced relative to said focal point and so convexly curved as to face outwardly in predetermined angular relation to said axis and simultaneously direct and concentrate substantially all of the light being received from corresponding parts of a conically shaped hollow annular object field of predetermined mean angular value and width onto said layer, and a layer of opaque material on a surface of said lens opposite said second surface and the layer of photosensitive material thereon.

4. A light-collecting and detecting system comprising a lens having an annularly shaped toric refracting surface formed thereon in concentric relation to a central axis of said system, and in predetermined spaced relation to a preselected focal point on said axis, said lens having a second surface thereon transversely intersecting said axis substantially at said focal point, a layer of photosensitive material of relatively small size carried by said second surface adjacent said focal point, said annularly shaped toric refracting surface being, in all radial sections thereof, convexly elliptically curved and so disposed relative to said focal point as to face generally outwardly in predetermined angular relation to said axis, the elliptical curvature of said refracting surface being such as to simultaneously monitor all parts of a conically shaped hollow annular object field of predetermined mean angular value and width so as to concentrate light from any part thereof onto said photosensitive layer of small size, whereby any material change in intensity in the light being received from any part of said annular object field will be detected by said photosensitive layer.

5. A light-collecting and detecting system comprising a lens having an annularly shaped toric refracting surface formed thereon in concentric relation to a central axis of said system, and in predetermined spaced relation to a preselected focal point on said axis, said lens having a second surface thereon transversely intersecting said central axis substantially at said focal point, a layer of photosensitive material of relatively small size carried by said second surface adjacent said focal point, said annularly shaped toric refracting surface being in all radial sections thereof, convexly elliptically curved and so disposed relative to said focal point as to face generally outwardly in predetermined angular relation to said central axis, and simultaneously direct and concentrate light being received from all parts of a conically shaped hollow annular object field of predetermined mean angular value onto said layer, the elliptical curvature of said refracting surface being such as to satisfy the formula $F_1F_2 = (2VF_2/(n_1 + 1)$ wherein $F_1F_2$ is the distance between the foci of said ellipse, $VF_2$ is the distance from the forward vertex of the ellipse to the rear foci thereof and $N_1$ is the refractive index of the material forming said lens, whereby any material change in intensity in the light being received from any part of said annular object field will be detected by said photosensitive layer.

6. A light-collecting and detecting system for simultaneously monitoring changes in light intensities in all parts of a hollow conically shaped object field extending outwardly from said system, said system comprising a lens having a first annularly shaped toric refracting surface formed thereon in concentric relation to a central axis through said lens, a second surface formed on said lens in spaced relation to said first surface, said second surface being a plane surface in transverse relation to said central axis and intersecting said axis substantially at a preselected focal point thereon, and a layer of photosensitive material of relatively small size upon said second surface and in concentric relation to said central axis, said first refracting surface, in all radial sections of said lens being so convexly curved and so spaced from said focal point and disposed in such predetermined mean offset angular relation with reference to said central axis as to jointly simultaneously face corresponding parts of said hollow conically shaped object field and focus the substantially parallel light being received from said corresponding parts respectively at said focal point.

7. A light-collecting and detecting system for simultaneously monitoring changes in light intensities in all parts of a hollow conically shaped object field extending outwardly from said system, said system comprising a lens having a first annularly shaped toric refracting surface formed thereon in concentric relation to a central axis through said lens, a second surface formed on said lens in spaced relation to said first surface, said second surface being a plane surface in transverse relation to said central axis and intersecting said axis substantially at a preselected focal point thereon, and a layer of photosensitive material of relatively small size upon said second surface and in concentric relation to said central axis, said first refracting surface, in all radial sections of said lens being so convexly curved and so spaced from said focal point and disposed in such predetermined mean offset angular relation with reference to said central axis as to jointly simultaneously face corresponding parts of said hollow conically shaped object field and focus the substantially parallel light being received from said corresponding parts respectively at said focal point, the width of said hollow conically shaped object field measured between the inner and outer edges thereof being of small predetermined angular value, and the size of said layer of photosensitive material being predetermined so as to receive substantially all of said focused light.

8. A light-collecting and detecting system for simultaneously monitoring changes in light intensities in all parts of a hollow conically shaped object field extending outwardly from said system, said system comprising a lens having a first annularly shaped toric refracting surface formed thereon in concentric relation to a central axis through said lens, a second surface formed on said lens in spaced relation to said first surface, said second surface being a plane surface in transverse relation to said central axis and intersecting said axis substantially at a preselected focal point thereon, and a layer of photosensitive material of relatively small size upon said second surface and in concentric relation to said central axis, said first refracting surface, in all radial sections of said lens being so convexly aspherically curved and so spaced from said focal point and disposed in such predetermined mean offset angular relation with reference to said central axis as to jointly simultaneously face corresponding parts of said hollow conically shaped object field and focus the substantially parallel light being received from said corresponding parts respectively at said focal point.

* * * * *